United States Patent Office 3,048,588
Patented Aug. 7, 1962

3,048,588
BARBITURIC ACID DERIVATIVES
Cornelius Kennady Cain, Flourtown, Pa., assignor to McNeil Laboratories, Incorporated, a corporation of Pennsylvania
No Drawing. Filed Mar. 1, 1961, Ser. No. 92,461
4 Claims. (Cl. 260—256.4)

This invention relates to a new organic compound, its salts and methods for its preparation.

The novel compound of this invention, 2-benzylimino-5-ethyl-5-isopentylbarbituric acid is prepared as follows: A mixture of 15 parts by weight of 2-thio-5-ethyl-5-isopentylbarbituric acid, 20 parts by volume of benzylamine and 50 parts by volume of xylene is refluxed for about twenty-eight hours. The xylene and excess benzylamine are removed by distillation under reduced pressure. The residue is dissolved in 100 parts by volume of ether and shaken with 300 parts by volume of 2 N hydrochloric acid. White crystals which form in the ether layer are collected by filtration and recrystallized first from a mixture of acetone and ether and then from a mixture of methanol and ether to give the hydrochloride salt of 2-benzylimino-5-ethyl-5-isopentylbarbituric acid, melting point 150 to 155° C. The aqueous acidic layer is neutralized with sodium hydroxide solution and shaken with the ether layer. Separation and evaporation of the ether solution gives a residue which, upon crystallization from a mixture of methanol and water, gives white crystals of 2-benzylimino-5-ethyl-5-isopentylbarbituric acid, melting point 203 to 205° C.

Since the new compound is amphoteric in character, it may be converted into either alkali- or acid-salt form, and it is intended that both forms be included within the scope of the invention.

Conversion to acid-salt form is accomplished by reacting the novel amphoteric compound with an appropriate acid, as for example an inorganic acid such as a hydrohalic acid, i.e. hydrochloric, hydrobromic, or hydriodic acid; sulfuric, nitric, or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, benzenesulfonic, p-toluenesulfonic, salicylic, p-aminosalicylic, 2-phenoxybenzoic, or 2-acetoxybenzoic acid. Conversely, the novel amphoteric compound may be converted to basic-salt form by reaction with an appropriate alkali, as for example an alkali metal or alkaline earth metal hydroxide, i.e. sodium hydroxide, potassium hydroxide, calcium hydroxide, or magnesium hydroxide. Obviously, conversion of the amphoteric, basic-salt and acid-salt forms from one to the other is readily accomplished by treatment with the appropriate reactant.

The novel compound of this invention, in all forms described above, is useful as a central nervous system stimulant. Depending upon the form employed, it may be administered orally or parenterally. It is a stable, white crystalline powder, slightly soluble in water.

An alternative and equally useful method for the preparation of the novel compound of the present invention comprises dissolving 4.6 parts by weight of sodium in 150 parts by volume of absolute ethanol, adding 14.9 parts by weight of benzylguanidine and 25.8 parts by weight of diethyl ethylisopentylmalonate. After the mixture has been refluxed for six hours, the alcohol is removed by distillation under reduced pressure. The residue is dissolved in water and acidified with acetic acid. Extraction with ether and evaporation of the ether solution leaves a residue which is crystallized from a mixture of methanol and water to give white crystals of 2-benzylimino-5-ethyl-5-isopentylbarbituric acid, melting point 203 to 205° C.

What is claimed is:
1. 2-benzylimino-5-ethyl-5-isopentylbarbituric acid.
2. The hydrochloride of 2-benzylimino-5-ethyl-5-isopentylbarbituric acid.
3. The pharmaceutically nontoxic alkali metal salt of 2-benzylimino-5-ethyl-5-isopentylbarbituric acid.
4. The pharmaceutically nontoxic alkaline earth metal salt of 2-benzylimino-5-ethyl-5-isopentylbarbituric acid.

References Cited in the file of this patent

Skinner et al.: Jour. Am. Chem. Soc., vol. 79, pages 6207–9 (1957).